E. H. JANNEY.
CAR COUPLING.
APPLICATION FILED JUNE 18, 1906. RENEWED NOV. 24, 1908.
974,154.
Patented Nov. 1, 1910.
3 SHEETS—SHEET 1.
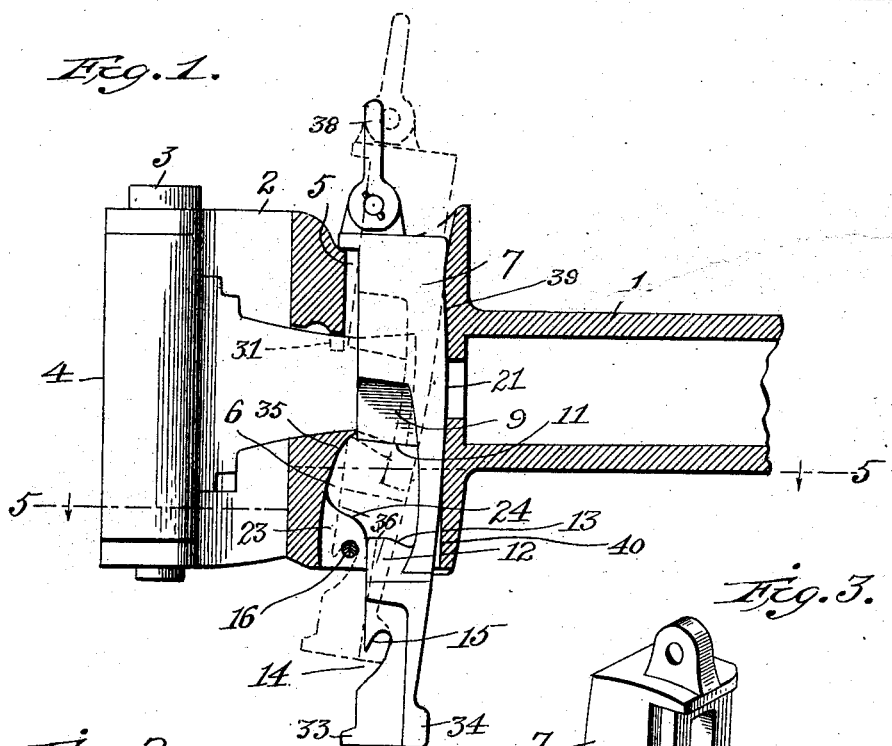
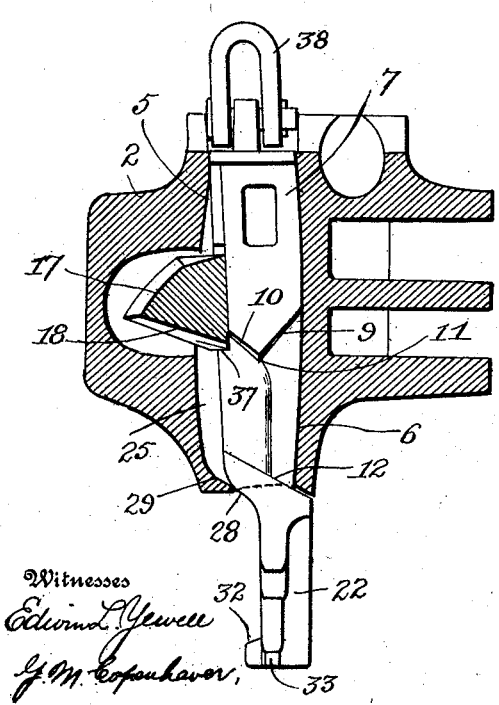
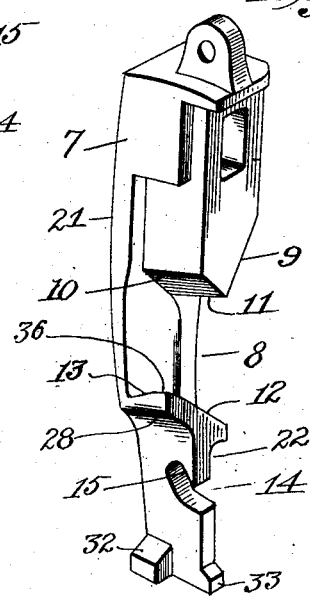
Witnesses
Edward L. Yewell
G. M. Copenhaver
Inventor
Eli H. Janney
by Percy B. Hills
Attorney

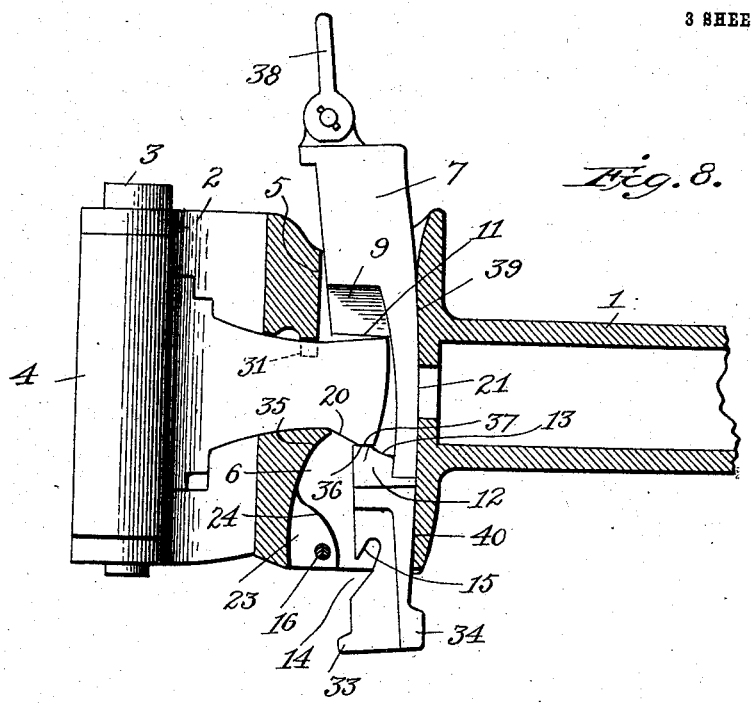
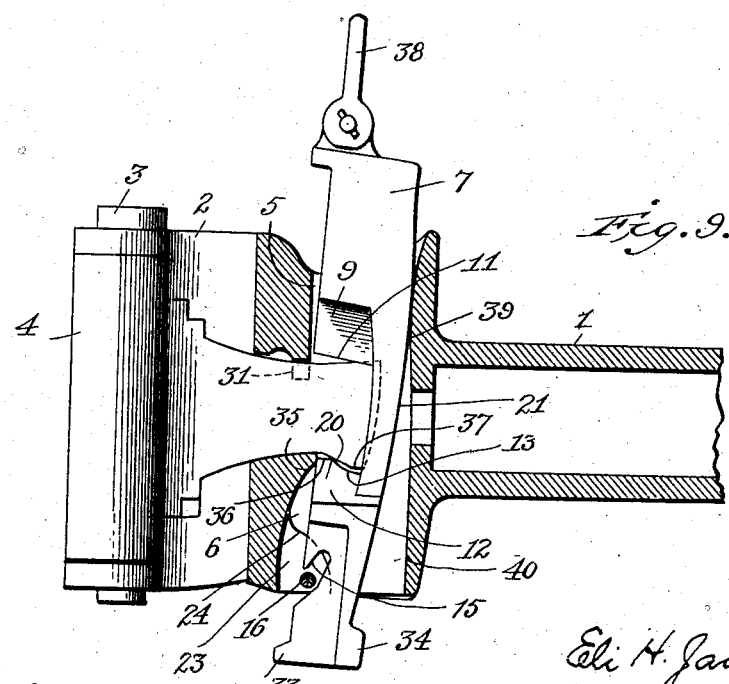

E. H. JANNEY.
CAR COUPLING.
APPLICATION FILED JUNE 18, 1906. RENEWED NOV. 24, 1908.

974,154.

Patented Nov. 1, 1910.

3 SHEETS—SHEET 2.

Witnesses
Edwin L. Yewell
G. M. Openhaver

Inventor
Eli H. Janney
by Percy B. Hill
Attorney

THE NORRIS PETERS CO., WASHINGTON, D. C.

UNITED STATES PATENT OFFICE.

ELI H. JANNEY, OF FAIRFAX COUNTY, VIRGINIA.

CAR-COUPLING.

974,154.  Specification of Letters Patent.  Patented Nov. 1, 1910.

Application filed June 18, 1906, Serial No. 322,331.  Renewed November 24, 1908.  Serial No. 464,286.

*To all whom it may concern:*

Be it known that I, ELI H. JANNEY, a citizen of the United States, residing in Fairfax county, State of Virginia, have invented new and useful Improvements in Car-Couplings, of which the following is a specification.

My invention relates to car couplings of the "Janney" type, and has for its object to provide certain improvements over the construction disclosed in Letters Patent No. 781,950, granted to me February 7, 1905, as will be hereinafter more definitely described and claimed.

Figure 4:
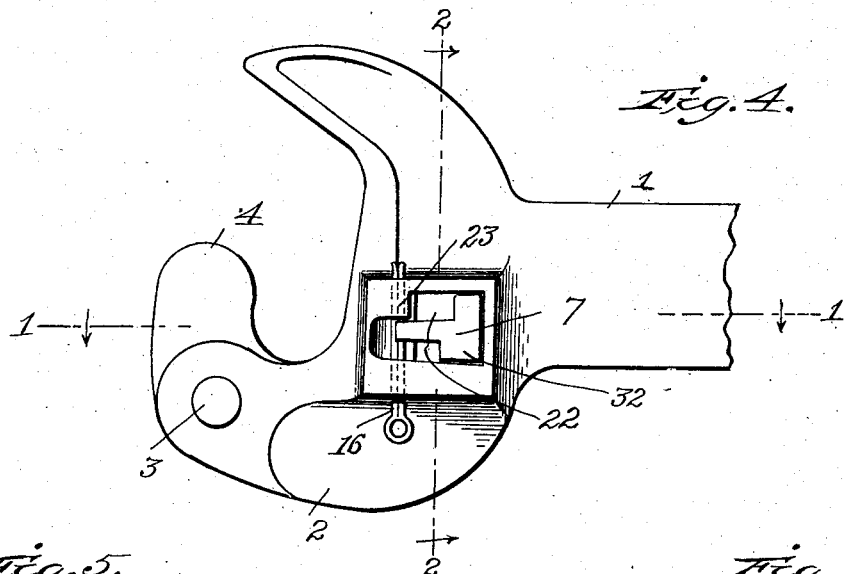
Figures 5, 6:
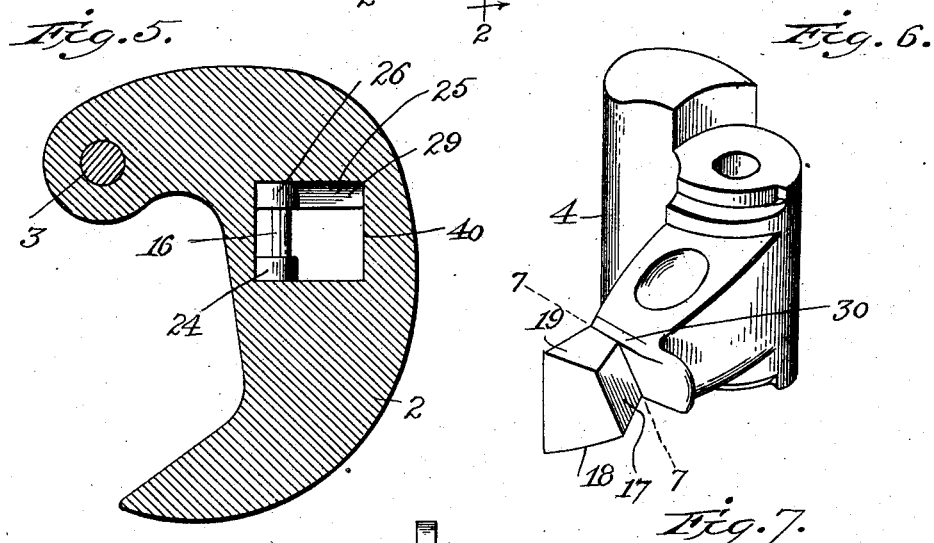
Figure 7:
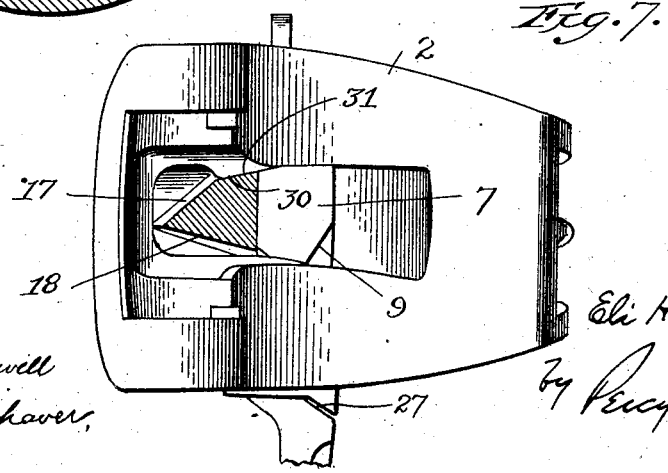

In the accompanying drawings: Figure 1 is a vertical longitudinal sectional view of my improved coupling, taken on the line 1—1, Fig. 4, the locking pin and coupling hook being shown in elevation. Fig. 2 is a vertical transverse sectional view, taken on the line 2—2, Fig. 4, the locking pin being shown in elevation. Fig. 3 is a detail perspective view of the locking pin. Fig. 4 is a bottom plan view of the coupling. Fig. 5 is a horizontal sectional view of the draw-head, taken on the line 5—5, Fig. 1, the locking pin being removed. Fig. 6 is a detail perspective view of the coupling hook. Fig. 7 is a front elevation of the draw-head, the coupling hook being shown in section on the line 7—7, Fig. 6. Fig. 8 is a view similar to Fig. 1, showing the position assumed by the locking pin when lifted by the coupling hook tail as the latter moves toward the closed position. Fig. 9 is a similar view showing the position assumed by said locking pin when raised by its lifting means.

Similar numerals of reference denote corresponding parts in the several views.

In the said drawing the reference numeral 1 denotes the draw-bar of the coupling, carrying the draw-head 2, in which is pivoted, by means of the pin 3, the usual coupling hook 4. Passing vertically through the upper and lower apertures 5 and 6 in the draw-head 2 is the locking pin 7, the same being recessed on its front side at 8 and having the upper face of said recess formed with a relatively long inclined or cam surface 9 and with a relatively short inclined or cam surface 10, inclining in the opposite direction from that of incline 9, the meeting edge 11 of said inclines being on a slight incline upward and forward. The lower face of said recess 8 is formed with a cam surface 12 inclining in a direction the reverse of cam surface 9 and having its upper end projecting beyond that portion of the side face of the pin against which the tail of the knuckle contacts when in locked position. As seen in Fig. 3, the upper portion of said cam surface 12 is also inclined downwardly from front to rear at 13. Below the recess 8 in the pin 7 is another recess 14, having its upper edge inclined upwardly and inwardly at 15 to engage a cotter pin 16 removably located in the draw-head, said cotter pin performing the double function of supporting the locking pin in the lock-set position, and preventing the complete withdrawal of the locking pin from the draw-head. The tail of the coupling hook 4 is reversely inclined on its upper and lower surfaces at 17 and 18 to correspond with the inclines 9 and 12, the upper incline 17 merging into a comparatively flat surface 19, while the lower incline 18 is also inclined at 20 to correspond with incline 13 on the pin 7.

All of the above parts being constructed to operate as described in my Letters Patent hereinbefore referred to, further detailed description of the same is deemed unnecessary.

Referring to Fig. 1, it will be seen that the rear wall of the apertures 5 and 6 in the draw-head 2 is slightly concaved to correspond with a similar convexity 21 on the rear face of the locking pin 7, the object of the same being to permit said pin, when lifted by the movement of the coupling hook 4 to the closed position, to hug said concaved surface, whereby, when released by said coupling hook, it will drop free from the lock-set pin 16 to its locking position.

The lower end of the locking pin 7 is cut away on one side at 22 to form a narrow surface in which is formed the recess 14, while that portion of the lower aperture 6 in the draw-head that receives the cotter-pin 16 is correspondingly narrowed by an abutment 23, whereby but a short portion of said cotter-pin is unsupported, the construction not only diminishing the danger of the cotter-pin being bent while acting as the lock-set for the locking pin 7, but also diminishing the weight of the locking pin. Said abutment 23 terminates in an inclined surface 24 just above the cotter-pin 16, while the opposite side of the draw-head is recessed at 25, as seen in Figs. 2 and 5, to permit the sidewise movement of the locking pin 7 when lifted, as hereinafter described, said recess 25 being provided with an abutment 26 similar to abutment 23 receiving the cotter-pin 16. By terminating the abutments 23 and 26 just above the cotter-pin 16 room is provided for the forward movement of the lower end of the locking pin 7 when moved to the lock-set position.

As described in my Letters Patent hereinbefore mentioned, the projecting portion at the lower side of incline 12 of the locking pin 7 performs the double function of an anti-creeping device and a means for throwing the locking pin beneath the tail of the coupling hook. An important feature of my present invention consists in providing said locking pin with an incline 28, substantially opposite to the incline 12, which, when the locking pin is in its lowermost position, engages a similar incline 29 formed in the lower aperture 6 of the draw-head at the lower end of the recess 25, as best seen in Fig. 2. The function of these inclines 28 and 29 is to facilitate the initial upward movement of the locking pin 7 when the incline 17 on the coupling hook tail engages the incline 9 on said locking pin during the movement of the coupling hook to the closed position. It will be apparent that, when said inclines 17 and 9 contact, a sidewise pressure toward incline 29 will be exerted on the locking pin 7, and the contact of incline 28 on the locking pin with incline 29 in the draw-head will instantly cause an initial rise of said locking pin, which would take place even if not assisted by the action of inclines 17 and 9. Through this initial rise thus imparted to the locking pin, the inclines 17 and 9 are in better coöperative position to continue the lift, and any binding action against the left hand side of the draw-head is thus effectually obviated.

By referring to Figs. 6 and 7 it will be seen that the top surface of the coupling hook tail, just to the rear of the surface 19, is provided with a transverse incline 30, while the upper inner surface of the draw-head that lies immediately above said incline 30 when the coupling hook is closed is similarly inclined at 31, the function of said inclines being to engage when the tail of the coupling hook is lifted slightly under a locking pin opening movement and to thus facilitate the opening movement of the coupling hook. And this engagement will become permanent when wear on the pivot pin 3 has permitted any vertical movement to said coupling hook.

On one side of the locking pin 7 at its lower end I provide a projecting incline 32, whose function it is, when the incline 12 on said locking pin has engaged the incline 18 on the coupling hook tail and has begun to force said coupling hook to the open position, to contact with the lower edge of the draw-head, just below the incline 29 therein, and thus force said locking pin, in the direction of movement of the coupling hook tail, thus aiding in forcing the latter to the open position.

By providing the front and rear projections 33 and 34 at the lower end of the locking pin 7, I furnish a sufficient width to said pin from front to rear to prevent its being lifted past the cotter-pin 16, so that said pin can be removed from the draw-head only when said cotter-pin has been removed.

Referring more particularly to Figs. 1 and 9, it will be seen that the front wall of the lower aperture 6 in the draw-head is inclined rearward and upward at its upper end at 35, the function of the same being to contact with the edge of the incline 12 on the locking pin the instant said locking pin is lifted from the lock-set position and thus at once begin to force the lower end of said locking pin rearward out of the line of engagement with the lock-set cotter-pin 16.

I have found in practice that, when my improved coupling is struck with considerable force during the act of coupling, the operation of the inclines 28 and 29, in conjunction with that of the inclines 9 and 17, is to throw the locking pin 7 upward sufficiently far to cause the inclines 13 and 20 on the locking pin and coupling hook tail, respectively, to contact, thus tending to throw the lower end of said locking pin forward and causing it to seat on the lock-set cotter-pin 16, whereby the coupling hook remained unlocked. This difficulty I have overcome by forming flat contact surfaces 36 and 37 on the adjacent points of contact between the inclines 13 and 20, respectively, the result being that, when the coupling hook tail in its passage to the closed position forces up the locking pin 7 to that extent, said flat surfaces 36 and 37 alone will contact, as shown in Fig. 8, thus, by reason of the configuration of the rear wall of the aperture in the draw-head and of the rear surface of the locking pin, the latter is forced, in the act of lifting, to hug said rear wall of the draw-head aperture, and thus prevent any forward impetus being given to the lower end of the locking pin, the latter dropping free from the lock-set to its locking position.

It will be observed that the locking pin 7 in its movement vertically has two distinct modes of operation, the same being dependent entirely upon the manner in which it is lifted, as follows: When lifted by the link 38, the tendency is to tilt the upper end of said locking pin backward, and thus throw its lower end forward, as clearly shown in Fig. 9, but, when lifted by the engagement of the inclines 9 and 17, during the movement of the coupling hook to the closed position, the tendency is to force the lower end of the locking pin backward to its limit of movement in that direction. This results in the curved rear face 21 of the locking pin hugging the rear wall of the apertures 5 and 6 in the draw-head, and as said locking pin is lifted the curve 39 in the draw-head will gradually throw the upper end of the locking pin forward, and consequently keep its lower end rearward, closely hugging the straight lower rear wall 40 of the draw-head, as clearly shown in Fig. 8. The necessary result of this operation is that, when the locking pin is forced upward with sufficient force to cause it to contact with the under side of the coupling hook tail, the flat surfaces 36 and 37 only can come into contact, thereby effectually preventing any forward movement being imparted to the lower end of the locking pin, and causing the latter to drop free from the lock-set, as hereinbefore described. Furthermore, this rearward movement of the locking pin permits a more perfect contact between the inclines 9 and 17 during the closing movement of the coupling hook, as it allows said locking pin to accommodate itself to the movement in the arc of a circle of the coupling hook tail, a result obviously impossible when the locking pin is limited to a vertical movement only.

The operation of the coupling, except as hereinbefore specifically set forth, being the same as that described in detail in my Letters Patent hereinbefore referred to, further description of its operation is deemed unnecessary.

Having thus described my invention, what I claim as new and desire to secure by Letters Patent is:

1. In a car coupling, the combination with the draw-head, a coupling hook pivoted therein, and a vertically moving locking and coupling hook opening pin for said coupling hook adapted to be automatically lifted by said coupling hook during the movement of the latter to the closed position, of coöperating means in the side of said draw-head and locking pin for imparting to the latter an initial upward movement when contacted with by said coupling hook.

2. In a car coupling, the combination with the draw-head, a coupling hook pivoted therein, and a vertically moving locking and coupling hook opening pin for said coupling hook adapted to be automatically lifted by said coupling hook during the movement of the latter to the closed position, of coöperating inclines in the side of said draw-head and locking-pin for imparting to the latter an initial upward movement when contacted with by said coupling hook.

3. In a car coupling, the combination with the draw-head, a coupling hook pivoted therein, a vertically movable locking pin for said coupling hook, and means on said locking pin and coupling hook for rotating the latter to the open position when the former is raised into contact therewith, of coöperating means on said coupling hook and draw-head for facilitating the rotation of said coupling hook to the open position.

4. In a car coupling, the combination with the draw-head, a coupling hook pivoted therein, a vertically movable locking pin for said coupling hook, and means on said locking pin and coupling hook for rotating the latter to the open position when the former is raised into contact therewith, of coöperating inclines on said coupling hook and draw-head for facilitating the rotation of said coupling hook to the open position.

5. In a car coupling, the combination with the draw-head, a coupling hook pivoted therein, a vertically movable locking pin for said coupling hook, and means on said locking pin and coupling hook for rotating the latter to the open position when the former is raised into contact therewith, of coöperating means on said locking pin and draw-head for causing said locking pin to move bodily laterally in the direction of rotation of said coupling hook as it is forced open by the lifting of said locking pin.

6. In a car coupling, the combination with the draw-head, a coupling hook pivoted therein, a vertically movable locking pin for said coupling hook, and means on said locking pin and coupling hook for rotating the latter to the open position when the former is raised into contact therewith, of an incline on said locking pin adapted to contact with said draw-head, when said locking pin is lifted to force the coupling hook open, and to force said locking pin bodily laterally in the direction of rotation of said coupling hook.

7. In a car coupling, the combination of the draw-head, having upper and lower apertures therein the lower aperture having a transversely narrowed portion, a coupling hook therein, a vertically movable locking pin for said coupling hook having a narrowed portion containing a lock-set recess, and a removable pin forming the lock-set seat located in said draw-head in the narrowed portion of the lower aperture thereof.

8. In a car coupling, the combination with the draw-head, a coupling hook pivoted therein, a vertically movable locking pin for said coupling hook, and coöperating inclines on the under side of the coupling hook tail and on the locking pin, said inclines being flattened at their adjacent points.

9. In a car coupling, the combination with the draw-head, a coupling hook pivoted therein, and a vertically movable locking pin for said coupling hook, the rear wall of the draw-head aperture receiving said locking pin being curved to project the upper end of the locking pin forward and the rear face of said locking pin being similarly curved to coöperate to cause said locking pin, when lifted and forced backward, to move in the arc of a circle that will bring its upper end forward and keep its lower end rearward.

In testimony whereof, I have hereunto set my hand in the presence of two subscribing witnesses.

ELI H. JANNEY.

Witnesses:
 PERCY B. HILLS,
 EDWIN L. YEWELL.